United States Patent
Nyffenegger et al.

(10) Patent No.: US 6,592,253 B2
(45) Date of Patent: Jul. 15, 2003

(54) PRECISION TEMPERATURE PROBE HAVING FAST RESPONSE

(75) Inventors: Johannes F. Nyffenegger, Dana Point, CA (US); Charles A. Battaglia, Vista, CA (US); Stephen G. Hadsall, Murrieta, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/974,457

(22) Filed: Oct. 9, 2001

(65) Prior Publication Data

US 2003/0067960 A1 Apr. 10, 2003

(51) Int. Cl.[7] .......................... G01K 1/14; G01K 13/00; G01K 7/16; G01L 7/00; H01C 7/00
(52) U.S. Cl. ...................... 374/143; 374/208; 374/183; 374/185; 338/28; 338/25; 73/714; 29/612
(58) Field of Search ................. 374/185, 208, 374/143, 148, 183; 338/40, 42, 25, 28, 14; 29/610.1, 612

(56) References Cited

U.S. PATENT DOCUMENTS

| | | | | |
|---|---|---|---|---|
| 4,086,467 A | * | 4/1978 | Grant | 219/544 |
| 4,168,404 A | * | 9/1979 | Lockard | 200/1 R |
| 4,560,973 A | * | 12/1985 | Grimm et al. | 338/28 |
| 4,688,949 A | * | 8/1987 | Hatakenaka | 374/183 |
| 5,300,919 A | * | 4/1994 | Caddock | 338/250 |
| 5,457,057 A | * | 10/1995 | Nath et al. | 437/2 |
| 5,883,305 A | * | 3/1999 | Jo et al. | 37/146.2 |
| 6,062,087 A | * | 5/2000 | Vovan | 73/726 |
| 6,130,598 A | * | 10/2000 | Katsuki et al. | 338/28 |
| 6,272,735 B1 | * | 8/2001 | Moriwake et al. | 29/612 |
| 6,299,349 B1 | * | 10/2001 | Steinel et al. | 374/143 |
| 6,341,892 B1 | * | 1/2002 | Schmermund | 374/185 |
| 6,425,293 B1 | * | 7/2002 | Woodroffe et al. | 73/756 |
| 2002/0067243 A1 | * | 6/2002 | Noli | 338/28 |
| 2002/0071475 A1 | * | 6/2002 | Betzner et al. | 374/185 |
| 2002/0090020 A1 | * | 7/2002 | Yu | 374/208 |
| 2002/0135455 A1 | * | 9/2002 | Murata et al. | 338/28 |
| 2002/0172259 A1 | * | 11/2002 | Bach | 374/208 |

FOREIGN PATENT DOCUMENTS

JP 60154148 A * 8/1985 .................... 374/4

* cited by examiner

Primary Examiner—Diego Gutierrez
Assistant Examiner—Gail Verbitsky
(74) Attorney, Agent, or Firm—Harness, Dickey & Pierce, P.L.C.

(57) ABSTRACT

A temperature probe (10) including a cylindrical thermally conductive housing (10) and a temperature sensor (18) employing a resistive temperature element (22) mounted therein. The temperature sensor (18) is mounted at one end of the housing (12) by a thermally conductive potting material (50). Signal wires (36) electrically couple to the resistive element (22) extend through an elongated insulated member (30) and out of an end of the housing (12) opposite the sensor (18). Changes in the temperature of the housing are quickly transferred to the resistive temperature element (22) through the conductive potting material (50). In one embodiment, the probe (10) is combined with a pressure transducer (60) to provide a pressure and temperature sensing device.

20 Claims, 2 Drawing Sheets

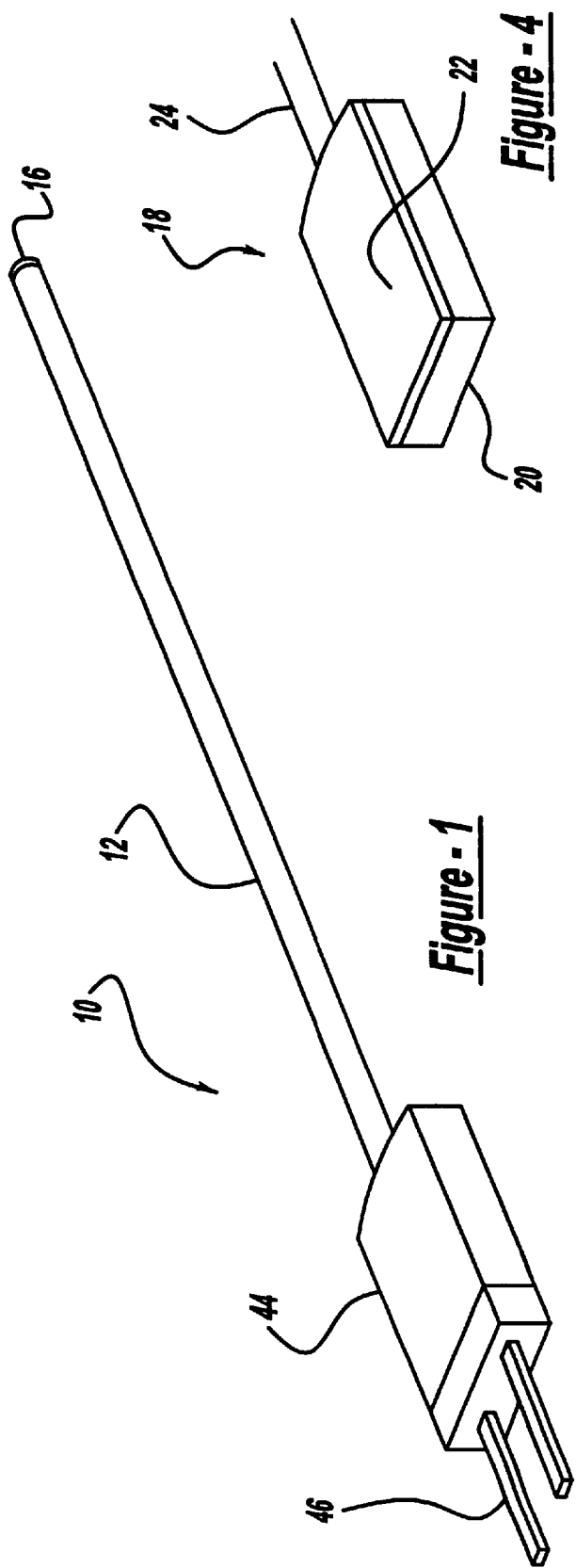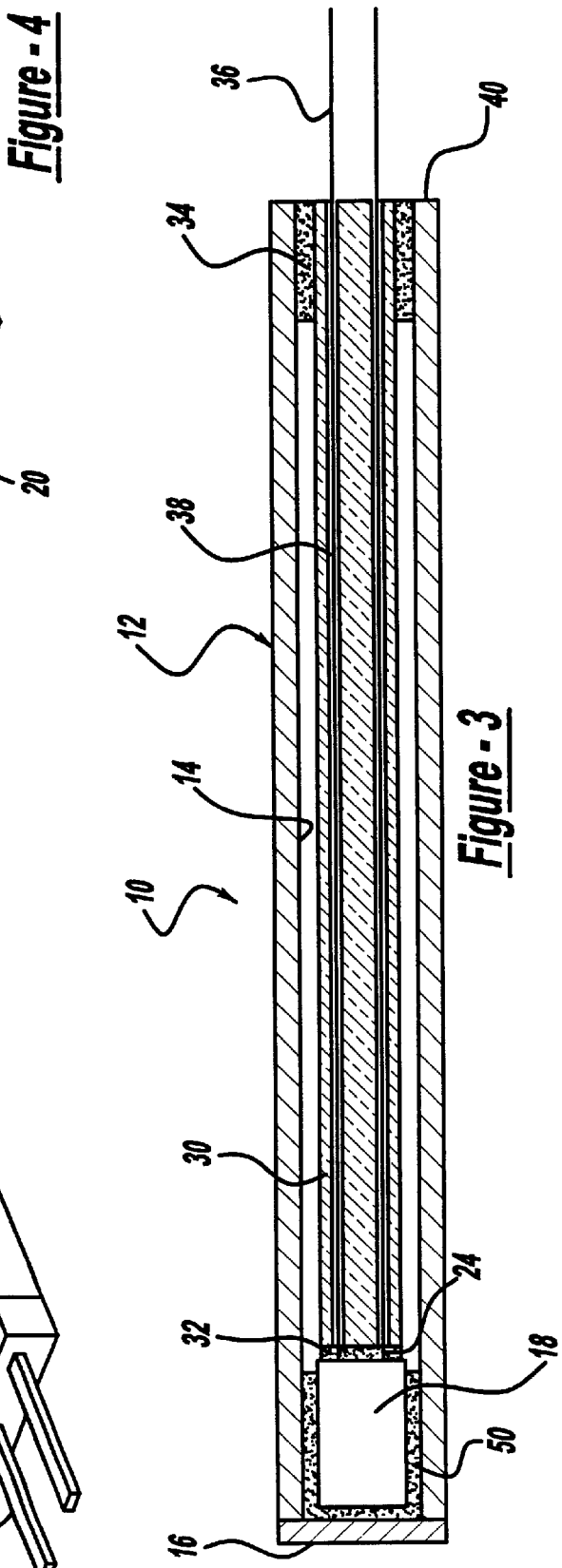

PRECISION TEMPERATURE PROBE HAVING FAST RESPONSE

GOVERNMENT RIGHTS

This invention was made with Government support under contract number F29601-97-C-0001 awarded by the United States Air Force. The Government has certain rights in this invention.

BACKGROUND OF THE INVENTION

1. Field of the invention

This invention relates generally to a temperature probe and, more particularly, to a temperature probe employing a resistive temperature element mounted within a protective housing by a thermally conductive material to provide a fast thermal response time.

2. Discussion of the Related Art

Temperature probes are used in many applications for sensing the temperature of a solid, liquid or gas. For example, temperature probes are used in certain laser systems to detect the temperature of hydrogen peroxide (BHP) used in the generation of the laser beam. Other applications include medical, pharmaceutical, food, chemical, aerospace and industrial applications. In certain applications, it is important to measure the temperature accurately and very quickly.

Different classes of temperature sensors are known in the art to measure temperature. One class of temperature sensors employs resistive elements, well known to those skilled in the art. As the temperature of the element increases or decreases, the resistance of the element also increases or decreases providing an indication of the temperature change. A voltage signal applied to the element is measured to give a reading of the resistance, and thus the temperature.

Known temperature probes that employ resistive elements typically have a response time of seven seconds or more. Particularly, when the temperature of the environment that the sensor is sensing changes, the sensor does not give the exact temperature reading for the change until more than seven seconds later. The probe response time is defined herein as the time it takes the temperature sensor to respond through 63.2% of the total temperature change. This slow of a response time is unacceptable in many applications. The slow response time can be attributed to the fact that the resistive element is mounted within a protective housing and air forms between the element and the housing.

SUMMARY OF THE INVENTION

In accordance with the teaching of the present invention, a temperature sensor employing a resistive temperature element is disclosed that has a faster response time than those sensors known in the art. The sensor includes an outer protective housing in which the resistive element is mounted. In one embodiment, the housing is a cylindrical tube made of a thermally conductive material. The element is mounted at one end of the housing, and signal wires extend through the housing and out of an opposite end of the housing. The element is mounted to an inside surface of the housing by a thermally conductive potting material. Therefore, changes in temperature received by the housing are quickly transferred to the element through the potting material giving a quick temperature response time.

Additional objects, advantages and features of the present invention will become apparent from the following description and appended claims, taken in conjunction with the accompanying drawings.

BRIEF DESCRIPTION OF THE DRAWINGS

FIG. 1 is a perspective view of a temperature sensor probe, according to an embodiment of the present invention;

FIG. 3 is a length-wise, cross-sectional view of the probe shown in FIG. 1;

FIG. 4 is a perspective view of the resistive element sensor mounted within the probe shown in FIG. 1;

DETAILED DESCRIPTION OF THE EMBODIMENTS

The following discussion of the embodiments of the invention directed to a temperature sensor probe employing a resistive element is merely exemplary in nature, and is in no way intended to limit the invention or its applications or uses.

Figure 2:
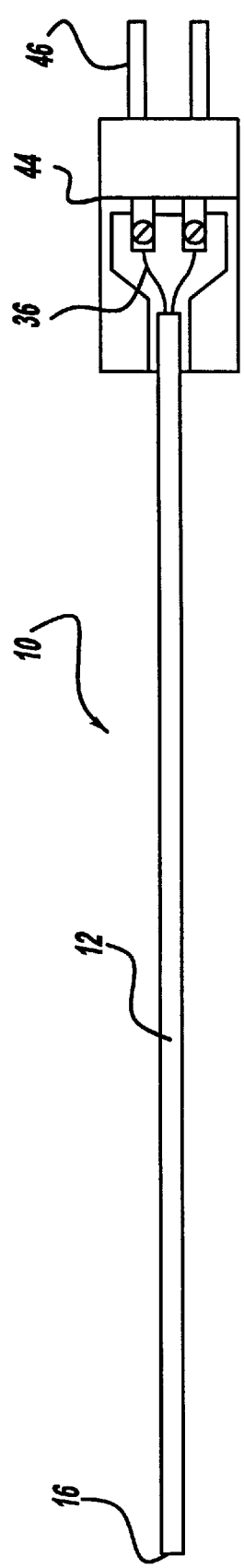
FIG. 2 is a bottom view of the probe shown in FIG. 1.

FIG. 1 is perspective view, FIG. 2 is a bottom view and FIG. 3 is a length-wise, cross-sectional view of a temperature sensor probe 10, according to an embodiment of the invention. The probe 10 includes an outer housing 12 defining a bore 14 therein that acts as a protective shield, and is made of a thermally conductive material, such as inconel, stainless steel, chromium, aluminum, etc. The housing 12 is cylindrical in this example because that shape lends itself to a more desirable configuration for many applications. Of course, in other examples, the shape of the housing 12 can be different to be more conducive for that application. Further, the diameter, wall thickness and length of the housing 12 is application specific. In one embodiment, the housing 12 has an outer diameter of ⅛ of an inch, an internal diameter of 0.095 inches and a length of 6 inches.

The housing 12 has an end cap 16 welded to and closing off one end of the housing 12. In one embodiment, the end cap 16 has a thickness of 0.01 inches. A thin film sensor 18 is mounted within the housing 12 proximate the end cap 16, as shown. FIG. 4 is a perspective view of the sensor 18 separated from the probe 10. The sensor 18 is a thin film sensor including a ceramic substrate 20 on which a resistive element 22 is mounted, and is a commercially available device. A pair of connecting leads 24 are electrically coupled to the element 22, and extend therefrom. In one embodiment, by way of non-limiting example, the sensor 18 has a thickness of 1.3 mm, a width of 2.0 mm and a length of 2.3 mm. The resistive element 22 is 100 Ω platinum in this embodiment, but can be other conductive materials. The connecting leads 24 are 30 AWG and 15 mm in length, and are made of 95% Au and 5% Pd.

A cylindrical insulating member 30 is positioned within the housing 12 proximate the sensor 18, and extends the length of the housing 12, as shown. One end of the member 20 is secured to the sensor 18 by a suitable sealing bond 32, and the opposite end of the member 20 is secured to an inside surface of the housing 12 by a cylindrical sealing bond 34. Signal wires 36 are electrically coupled to the leads 24 and extend through parallel bores 38 in the member 30 and out of an end 40 of the probe 10 opposite the end cap 16. The wires 36 are electrically coupled to an electrical receptacle 44 mounted to the end 40. The receptacle 44 includes terminals 46 electrically coupled to the wires 36 to provide the signal to the sensor 18.

According to the invention, the sensor 18 is mounted to the inside of the housing 12 by a potting material 50. The potting material 50 is a thermally conductive material that provides a good thermal contact between the sensor 18 and the housing 12. Therefore, when the outside of the housing 12 receives a temperature change, that change in temperature is immediately transferred to the sensor 18 through the potting material 50.

The potting material 50 can be any thermally conductive material suitable for the purposes described herein. In one embodiment, the material 50 is a mixture of silver particles suspended in a resin and suitable solvent. The potting material 50 is inserted into the housing 12 as a liquid so that when the sensor 18 is inserted into the housing 12 it causes the liquid potting material to fill in the spaces between the sensor 18 and the end cap 16, and the sensor 18 and the inside wall of the housing 12, as shown. In one embodiment, the sensor 18 is inserted into the housing 12 so that a 0.5 mm gap, filled with the potting material 50, is provided between the sensor 18 and the end cap 16. Once the sensor 18 is positioned within the liquid potting material 50 in the housing 12, the housing 12 is cured to harden the potting material 50.

The temperature probe 10 was measured for response time by a suitable signal condition module, such as the SCM 5B35-1438, coupled to a memory oscilloscope, such as the Tektronic Model 7H-730A. Temperature response times 15 to 20 times faster than those known in the art were measured. In one test, the probe 10 was immersed in an ice bath, and measured a 540 msec response time when the bath was still, and a 320 msec when the bath was agitated.

The probe 10 described above can be made by any suitable assembly process. In one embodiment, a specific procedure is followed to fabricate the probe 10, according to the invention. The following steps describe that process in general detail as a non-limiting example. The cylindrical housing 12 is cut and deburred. The end cap 16 is fabricated and welded to one end of the cut housing 12. The housing 12 and the end cap 16 are then degreased and ultrasonically cleaned. Next, the housing 12 and end cap 16 are oven dried and sealed in a protective bag. The signal wires 36 are then soldered to the leads 24. The wires 36 are inserted into the channels 38, and the sensor 18 is bonded to the member 20 with the seal bond 32, such as an M-bond GA-61. The sensor and member assembly is then oven cured per the M-bond GA-61 specification. The member and sensor assembly is then held in a vice, and a predetermined amount of the liquid potting material 50 is placed on top and around the sensor 18.

The housing 12 is also held in a vice, and the liquid potting material 50 is inserted into the housing 12 using a syringe. The housing 12 is then installed on a vibration table and the vibration table is operated at approximately 100 Hz, and approximately 1–2 mils peak-to-peak displacement. The member and sensor assembly is inserted vertically into the vibrating housing 12 to a predetermined depth marked on the member 20. The inserted member and sensor assembly is centered in the housing 12 using three steel wedges firmly placed at 120 degrees. The complete assembly is cured from ambient to 200° C. over 180 minutes, and then cooled at ambient. The temperature and time of the curing process is selected so that the solvent in the potting material gradually evaporates without the formation and permanent inclusion of miniature air bubbles that would severely affect the thermal performance of the probe 10.

Figure 6:
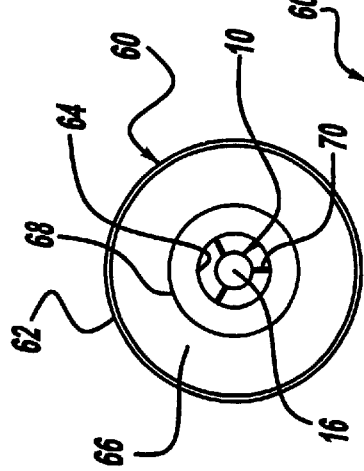
FIG. 6 is an end view of the assembly shown in FIG. 5.
Figure 5:
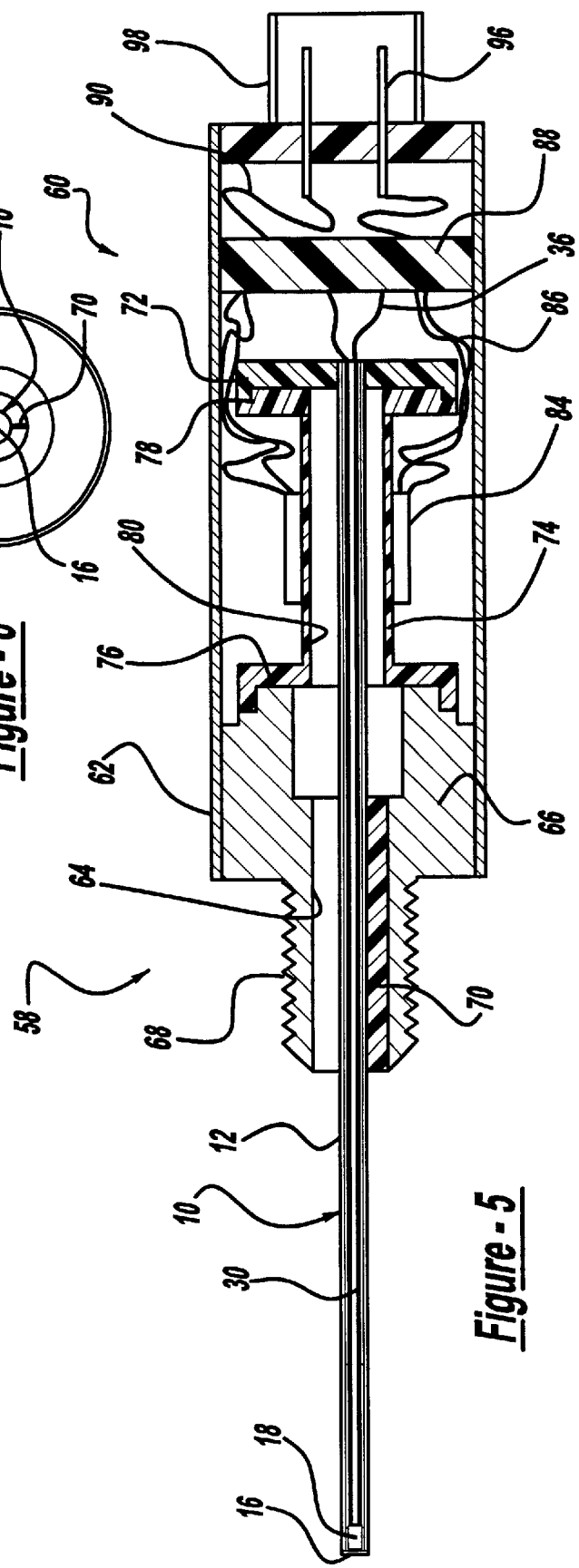
FIG. 5 is a length-wise, cross-sectional view of a temperature/pressure sensor assembly employing the temperature probe shown in FIG. 3.

The probe 10 described above can be used in combination with other types of sensing devices. For example, a temperature/pressure sensor assembly 58 is shown in a length-wise, cross-sectional view in FIG. 5 and an end view in FIG. 6, and is a combination of the probe 10 and a pressure transducer 60, according to the invention. In one embodiment, the pressure transducer 60 embodies the series PT700 transducer, available from Stellar Technologies, Inc. The probe 10 is inserted into an enclosure 62 through a bore 64 extending through an end piece 66 attached to one end of the enclosure 62, so that the end cap 16 of the probe 10 extends therefrom, as shown. The end piece 66 includes a threaded connector 68 that allows the transducer 60 to be threadably connected to a suitable opening, as would be well understood to those skilled in the art. The bore 64 defines a pressure port of the transducer 60. The probe 10 is secured to a base plate 72 mounted within the enclosure 62, as shown. The probe 10 is held within the bore 64 by extended support fins 70 placed at three locations separated by 120° around an outside of the housing 12, as shown.

A sensing tube 74 is mounted within the enclosure 62, where a first end flange 76 of the tube 74 is mounted to the end piece 66 and a second end flange 78 of the tube 74 is mounted to the base plate 72, as shown. A chamber 80 within the sensing tube 74 is coaxial with the bore 64. A metal film, full bridge rectifier, strain gage pressure sensor 84 is mounted to an outside surface of the sensing tube 74 within the enclosure 62. An electrical receptacle 98 including pin terminals 96 is mounted and hermetically sealed to an end of the enclosure 62 opposite the end piece 66. A signal conditioning module 88 is mounted within the enclosure between the base plate 72 and the receptacle 98. Four signal lines, one for each rectifier in the sensor 84, is electrically coupled to the sensor 84 and the conditioning module 88. Likewise, the signal lines 36 are coupled to the conditioning module 88.

An external pressure change is transferred to the chamber 80 through the bore 64, and causes the tube 74 to expand or contract in response thereto. This expansion or contraction of the tube 74 changes the strain on the pressure sensor 84, giving an electrical indication thereof to its full bridge rectifier. The signal lines 86 are electrically coupled to each leg of the bridge rectifier in the sensor 84 to give a measure of the strain on the sensor 84, in a manner that is well understood in the art. The conditioning module 88 processes the signals on the signal wires 86 and 36 and provides selective pressure sensing and temperature sensing outputs on signal wires 90. The signal wires 90 are coupled to the connector pins 96 of the electrical receptacle 98 sealed to the enclosure 62. The receptacle 98 is electrically coupled to any suitable measuring circuit (not shown) to provide a display of the temperature and pressure, as would be well understood to those skilled in the art.

Various parameters and specifications can be used for the combination of the temperature probe 10 and the pressure transducer 60 assembly discussed above. In one embodiment, the pressure transducer 60 has a response time of 10 msec at 90% FS, a maximum 10 microamps peak-to-peak output and a pressure range of 0–350 psia FS. The temperature probe 10 has a response time of 10 msec at 90% FS, a temperature coefficient of 0.00385, a maximum element excitation of 1.0 mA, a temperature range of −23° C.–27° C. FS and an output ripple of a maximum 10 microamps peak-to-peak.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A temperature probe assembly comprising:
a temperature probe comprising a housing made of a thermally conductive material, said housing including an inner channel;
a temperature sensor mounted within the channel, said sensor including a resistive element responsive to temperature changes and signal wires connected thereto; and
a thermally conductive potting material holding the sensor within the housing, said potting material being in contact with the resistive element and the housing so as to transfer temperature changes from an outer surface of the housing to the resistive element; and said assembly further comprising
a pressure transducer including an enclosure, said probe extending through a pressure port in the enclosure, said pressure transducer including a pressure sensor mounted within the enclosure the senses a pressure change transferred through the pressure port.

2. The probe assembly according to claim 1 wherein the potting material is made of a solvent including interspersed silver particles.

3. The probe assembly according to claim 1 wherein the potting material is a cured liquid solvent.

4. The probe assembly according to claim 1 wherein the housing is a cylindrical tube, said sensor being positioned at one end of the housing therein.

5. The probe assembly according to claim 4 further comprising an elongated insulating member, said signal wires extending through channels in the insulating member and out of an end of the housing opposite the sensor.

6. The probe assembly according to claim 5 wherein the insulating member is bonded to the sensor and to an inside wall of the housing.

7. The probe assembly according to claim 1 wherein the housing includes a flat end cap, said sensor being mounted within the housing proximate the end cap.

8. The probe assembly according to claim 1 further comprising an electrical terminal mounted to the housing, said signal wires being electrically connected to the terminal.

9. The probe assembly according to claim 1 wherein the sensor is suspended within the potting material so that the distance between an internal surface of the channel and the sensor is about 0.5 mm.

10. The probe assembly according to claim 1 wherein the pressure transducer includes a pressure sensing tube mounted within the enclosure, said probe extending through the pressure sensing tube, said pressure sensor being mounted to an outer surface of the pressure sensing tube.

11. The probe assembly according to claim 1 wherein the pressure sensor is a metal film, full bridge rectifier strain gage.

12. The probe assembly according to claim 1 further comprising a signal conditioning module, wherein the signal wires from the temperature sensor and signal wires from the pressure sensor are electrically coupled to the signal conditioning module, said signal conditioning module including a pair of output signal lines coupled to an electrical connector.

13. A resistive element temperature probe assembly for sensing a temperature of an environment, said probe comprising:
a temperature probe comprising a cylindrical housing made of a thermally conductive material, said housing including an internal bore;
a temperature sensor mounted within the bore at one end of the housing, said sensor including a resistive element responsive to temperature changes mounted on a ceramic substrate and a pair of signal wires connected thereto;
a cylindrical insulating member mounted to the sensor and to an inside surface of the bore of the housing, said signal wires extending through channels in the insulating member and out of an end of the housing opposite the sensor, and
a thermally conductive potting material formed in the bore within the housing and securing the sensor within the housing, said potting material being in contact with the resistive element and the housing so as to transfer temperature changes from an outer surface to the resistive element, said potting material being a cured liquid solvent; and said assembly further comprising
a pressure transducer including an enclosure, said probe extending through a pressure port in the enclosure, said pressure transducer including a pressure sensor mounted within the enclosure that senses a pressure change transferred through the pressure port.

14. The probe assembly according to claim 13 wherein the potting material includes interspersed silver particles.

15. The probe assembly according to claim 13 wherein the sensor is suspended within the potting material so that the distance between an internal surface of the channel and the sensor is about 0.5 mm.

16. The probe assembly according to claim 13 wherein the pressure transducer includes a pressure sensing tube mounted within the enclosure, said probe extending through the pressure sensing tube, said pressure sensor being mounted to an outer surface of the pressure sensing tube.

17. The probe assembly according to claim 13 wherein the pressure sensor is a metal film, full bridge rectifier strain gage.

18. The prove assembly according to claim 14 further comprising a signal conditioning module, wherein the signal wires front the temperature sensor and signal wires from the pressure sensor are electrically coupled to the signal conditioning module, said signal conditioning module including a pair of output signal lines coupled to an electrical connector.

19. A method of manufacturing a probe, comprising:
a bonding a resistive element within a channel of a thermally conductive housing with a thermally conductive potting material, wherein the resistive temperature element is mounted within the channel by inserting the conductive potting material in liquid form into the housing, positioning the resistive temperature element within the channel so that the liquid potting material forms around the temperature element and is in contact with the housing, and curing the liquid potting material; and
placing the housing in contact with an environment so that temperature changes of the environment are transferred through the potting material to the resistive element.

20. A method of manufacturing a probe, comprising:
bonding a resistive temperature element within a channel of a thermally conductive housing with a thermally conductive potting material;
placing the housing in contact with an environment so that temperature changes of the environment are transferred through the potting material to the resistive element; and
positioning the conductive housing within a pressure port of a pressure transducer so that the housing is secured therein and that an end of the housing including the resistive temperature element extends therefrom.

* * * * *